United States Patent [19]
Gushiken et al.

[11] Patent Number: 5,844,774
[45] Date of Patent: Dec. 1, 1998

[54] PORTABLE APPARATUS WITH HOUSING FOR CONTAINING FUNCTIONAL ELEMENTS AND WITH BRACKET FOR SUPPORTING THE HOUSING

[75] Inventors: Hajime Gushiken; Masashi Mikami, both of Tokyo, Japan

[73] Assignee: Kabushiki Kaisha Toshiba, Kawasaki, Japan

[21] Appl. No.: 794,051

[22] Filed: Feb. 4, 1997

[30] Foreign Application Priority Data

Apr. 8, 1996 [JP] Japan .................................. 8-085139

[51] Int. Cl.⁶ ..................................................... G06F 1/16
[52] U.S. Cl. ............................................................ 361/681
[58] Field of Search ...................... 364/708.1; 312/223.2; 248/917–919; 361/681

[56] References Cited

U.S. PATENT DOCUMENTS

| | | |
|---|---|---|
| 5,075,929 | 12/1991 | Chung ........................................ 16/342 |
| 5,107,402 | 4/1992 | Malgouires .......................... 361/683 X |
| 5,566,048 | 10/1996 | Esterberg et al. ....................... 361/681 |

*Primary Examiner*—Michael W. Phillips
*Attorney, Agent, or Firm*—Finnegan, Henderson, Farabow, Garrett & Dunner, L.L.P.

[57] ABSTRACT

A portable apparatus such as a portable computer comprises a box-shaped housing, a functional element contained within the housing, and a bracket for supporting the housing. The bracket has a coupling portion situated within the housing. The housing includes a wall for supporting the functional element and a peripheral wall formed to be continuous with a peripheral edge portion of the wall and to surround the functional element. The coupling portion of the bracket is fixed to the peripheral wall of the housing.

16 Claims, 6 Drawing Sheets

PORTABLE APPARATUS WITH HOUSING FOR CONTAINING FUNCTIONAL ELEMENTS AND WITH BRACKET FOR SUPPORTING THE HOUSING

BACKGROUND OF THE INVENTION

The present invention relates generally to a portable apparatus such as a portable computer or a word processor, and more particularly to a structure for attaching a bracket to a display housing for containing a display device of the portable apparatus.

A portable apparatus such as a portable computer comprises a main body having a keyboard, and a display unit having a liquid crystal display (LCD) device. The display unit is supported on the main body by means of a hinge mechanism. Thus, the display unit is rotatable between a closed position where it covers the keyboard and an open position where the keyboard is exposed.

Figure 7:
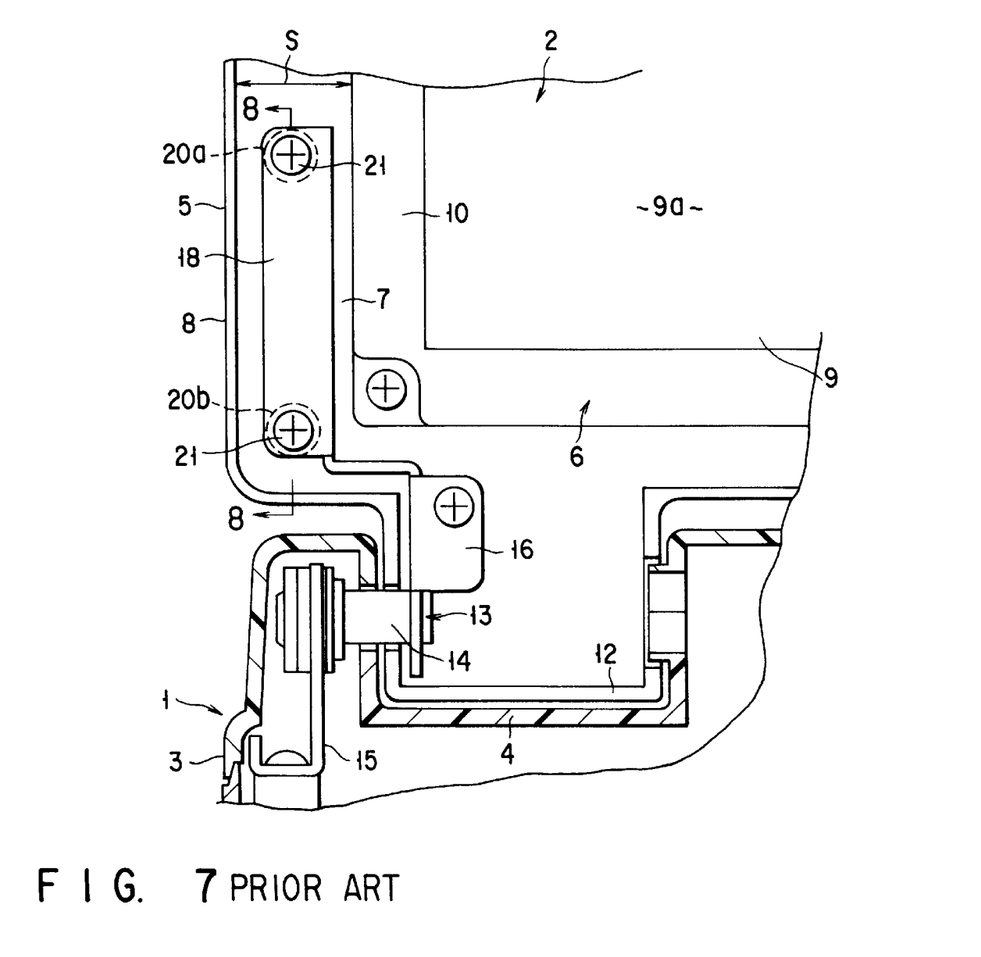
FIG. 7 is a cross-sectional view of a conventional portable computer, showing the structure of a coupling portion between a main body and a display unit.

FIG. 7 shows a support structure for supporting a display unit in a conventional portable computer. In FIG. 7, reference numeral 1 denotes a main body, and 2 a display unit. The main body 1 has a box-shaped housing 3. A display support portion 4 is formed at a rear end portion of the upper surface of housing 3. The display support portion 4 is formed in a recess shape, opening to the upper side, front side and rear side of the housing 3 successively.

The display unit 2 includes a display housing 5 and a liquid crystal display (LCD) device 6 contained within the display housing 5. The display housing 5 includes a flat bottom wall 7 and a peripheral wall 8 continuous with a peripheral edge of the bottom wall 7. The display housing 5 has a generally flat box-like shape.

The LCD device 6 includes a liquid crystal (LC) panel 9 with a display screen 9a, and a frame 10 supporting the LC panel 9. The frame 10 of LCD device 6 is screwed down on the bottom wall 7 of display housing 5. Accordingly, the display screen 9a of LC panel 9 is parallel to the bottom wall 7.

The display housing 5 has a leg portion 12. The leg portion 12 is inserted in the display support portion 4 of the main body 1. The leg portion 12 is rotatably supported on the housing 3 by means of a hinge mechanism 13.

The hinge mechanism 13 includes a hinge shaft 14 and first and second brackets 15 and 16. The hinge shaft 14 has a first end portion put inside the housing 3 and a second end portion put inside the leg portion 12. The first bracket 15 is rotatably coupled to the first end portion of hinge shaft 14. The first bracket 15 is contained within the housing 3 and fixed to the housing 3 by means of a screw. The second bracket 16 is fixed to the second end portion of hinge shaft 14. The second bracket 16 is contained in the leg portion 12 and screwed down to the leg portion 12.

The hinge shaft 14 is supported on the main body 1 and display housing 5 by means of the first and second brackets 15 and 16. The hinge shaft 14 acts as a fulcrum for rotation of the display unit 2.

The second bracket 16, as shown in FIG. 7, integrally includes a coupling portion 18. The coupling portion 18 increases the strength of the coupling between the second bracket 16 and display housing 5. The coupling portion 18 extends from the inside of the leg portion 12 to a location between the peripheral wall 8 of display housing 5 and the LCD device 6. The coupling portion 18 has a flat plate shape, facing the bottom wall 7 of housing 5.

Figure 8:
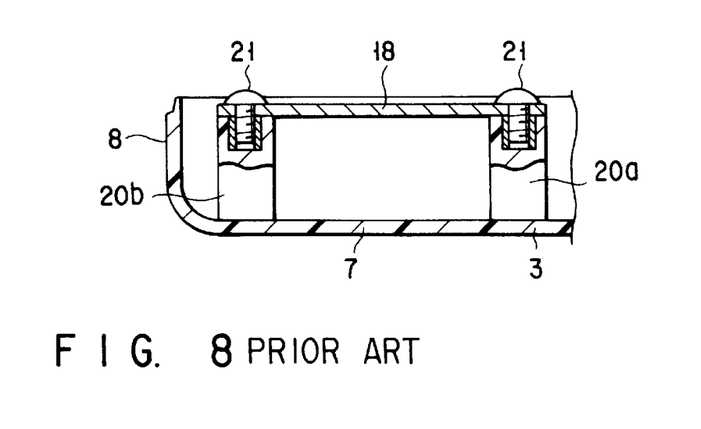
FIG. 8 is a cross-sectional view taken along line 8—8 in FIG. 7.

As is shown in FIGS. 7 and 8, the bottom wall 7 has a pair of boss portions 20a and 20b for receiving the coupling portion 18. The boss portions 20a and 20b are located between the peripheral wall 8 and the LCD device 6. The coupling portion 18 is fastened to the boss portions 20a and 20b by means of screws 21.

According to this conventional structure, the coupling portion 18 of second bracket 16 is supported on the bottom wall 7 of display housing 5. It is thus necessary to provide the bottom wall 7 with the boss portions 20a and 20b for receiving the coupling portion 18. Consequently, it is necessary to increase a distance S between the peripheral wall 8 of display housing 5 and the LCD device 6, thereby to provide a space for situating the boss portions 20a and 20b and the coupling portion 18 of the second bracket 18. As a result, a dead space extending in the width direction of display housing 5 is left in the display housing 5.

If the width of the display housing 5 is unchanged, the width of the LCD device 6 to be mounted is limited due to the presence of the dead space. It is not possible to increase the size of the LC panel 9. In addition, the dead space is located on the lateral sides of the LCD device 6 within the display housing 5. If the LC panel 9 of LCD device 6 is enlarged in the width direction of the display housing 5, the width of the display housing 5 would increase by a distance corresponding to the dead space. As a result, the width of the display unit 2 would increase and the size of the display unit 2 would inevitably increase.

BRIEF SUMMARY OF THE INVENTION

The present invention has been made in consideration of the above circumstances and an object thereof is to provide an electronic apparatus wherein a dead space is decreased as much as possible in the inside of a housing and a space for containing functional elements can be increased without enlarging the housing.

In order to achieve the above object, this invention provides a portable apparatus comprising:

a housing;

a functional element contained within the housing; and a bracket supported by the housing, the bracket having a coupling portion situated within the housing, wherein the housing includes a wall for supporting the functional means and a peripheral wall formed to be continuous with a peripheral edge portion of the wall, and the coupling portion of the bracket is fixed to the peripheral wall.

According to this structure, the coupling portion of the bracket is fixed to the peripheral wall of the housing and thus there is no need to provide the wall of the housing with the boss portion for receiving the coupling portion. Accordingly, a useless space is not provided between the peripheral wall of the housing and functional element, and the space for containing the functional element can be sufficiently provided within the housing without enlarging the housing. Therefore, the size of each functional element can be increased, and functional element can be arranged at high density.

The present invention also provides a portable computer comprising:

a body having a first housing;

a display unit having a second housing and a second device contained within the second housing; and a hinge mechanism for rotatably coupling the display unit to the body, the hinge mechanism having a bracket situated within the second housing, wherein the second housing includes a wall for supporting the display device and a peripheral wall formed to be continuous with a peripheral edge portion of the wall, the bracket being fixed to the peripheral wall.

According to this structure, the bracket is fixed to the peripheral wall of the second housing and thus there is no need to provide the wall of the second housing with the boss portion for receiving the bracket. Accordingly, a useless space is not provided between the peripheral wall of the second housing and display device, and the space for containing the display device can be sufficiently provided within the second housing without enlarging the second housing. Therefore, the size of the display device may be increased.

The present invention also provides a portable computer comprising:

a body having a first housing and a circuit board contained in the first housing;

a display unit having a second housing and a second device contained within the second housing; and a hinge mechanism for rotatably coupling the display unit to the body, the hinge mechanism having a first bracket situated within the housing and a second bracket situated within the second housing, wherein the first housing includes a bottom wall for supporting the circuit board and a side wall formed to be continuous with a peripheral edge portion of the bottom wall and to surround the circuit board, the first bracket being fixed to the side wall, and the second housing includes a wall for supporting the display device and a peripheral wall formed to be continuous with a peripheral edge portion of the wall and to surround the display device, the second bracket being fixed to the peripheral wall.

According to this structure, the first bracket is fixed to the side wall of the first housing and thus there is no need to provide the bottom wall of the first housing with the boss portion for receiving the first bracket. Accordingly, a useless space is not provided between the side wall of the first housing and circuit board, and the space for containing the circuit board can be sufficiently provided within the first housing without enlarging the first housing. Therefore, the size of the circuit board may be increased.

According to this structure, the second bracket is fixed to the peripheral wall of the second housing and thus there is no need to provide the wall of the second housing with the boss portion for receiving the second bracket. Accordingly, a useless space is not provided between the peripheral wall of the second housing and display device, and the space for containing the display device can be sufficiently provided within the second housing without enlarging the second housing. Therefore, the size of the display device may be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention, as applied to a portable computer, will now be described with reference to FIGS. 1 to 4.

Figure 1:
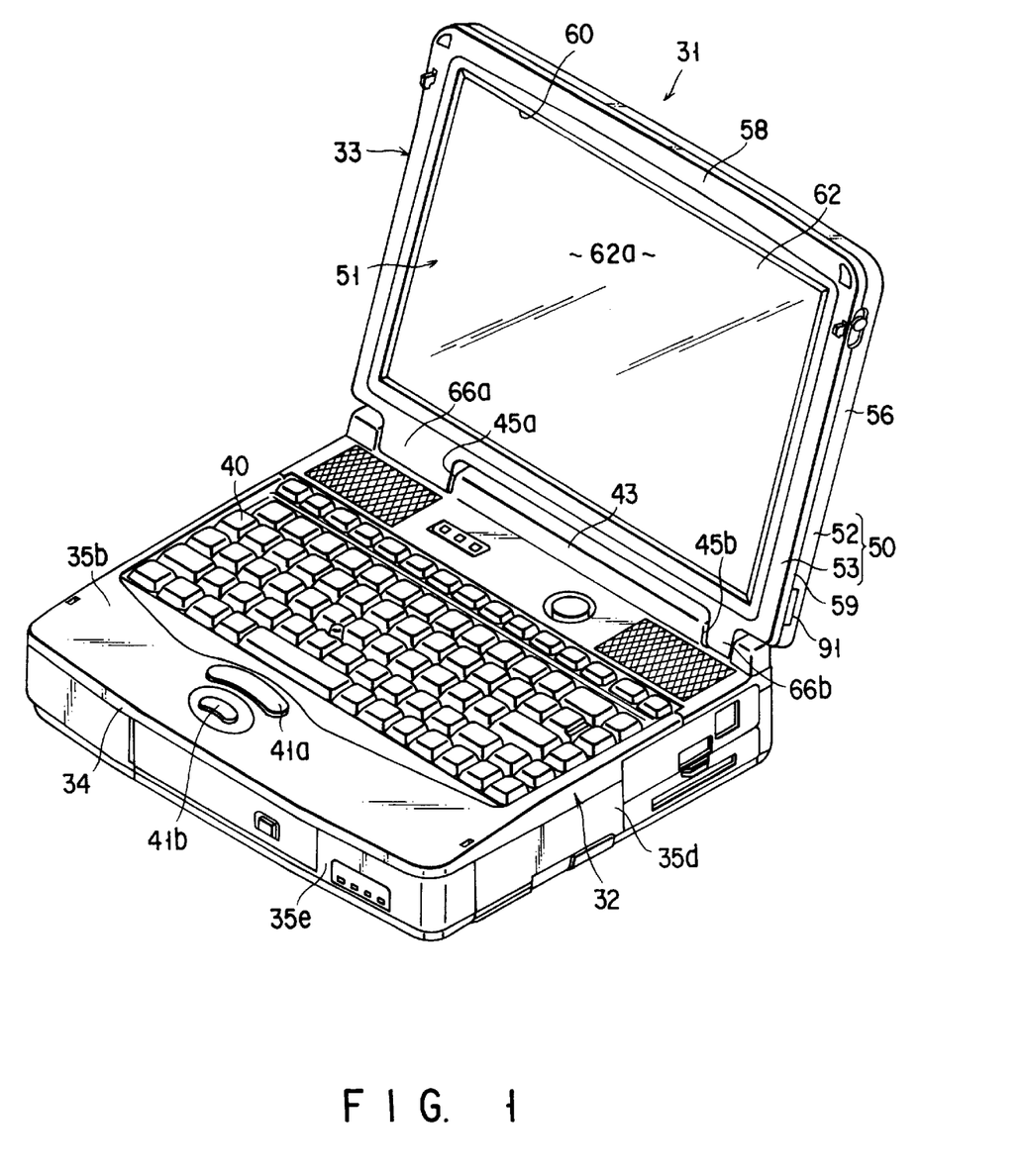
FIG. 1 is a perspective view of a portable computer according to a first embodiment of the present invention.

FIG. 1 shows an "A4"-sized book-type portable computer 31. The computer 31 comprises a main body 32 and a display unit 33 supported on the main body 32.

Figure 2:
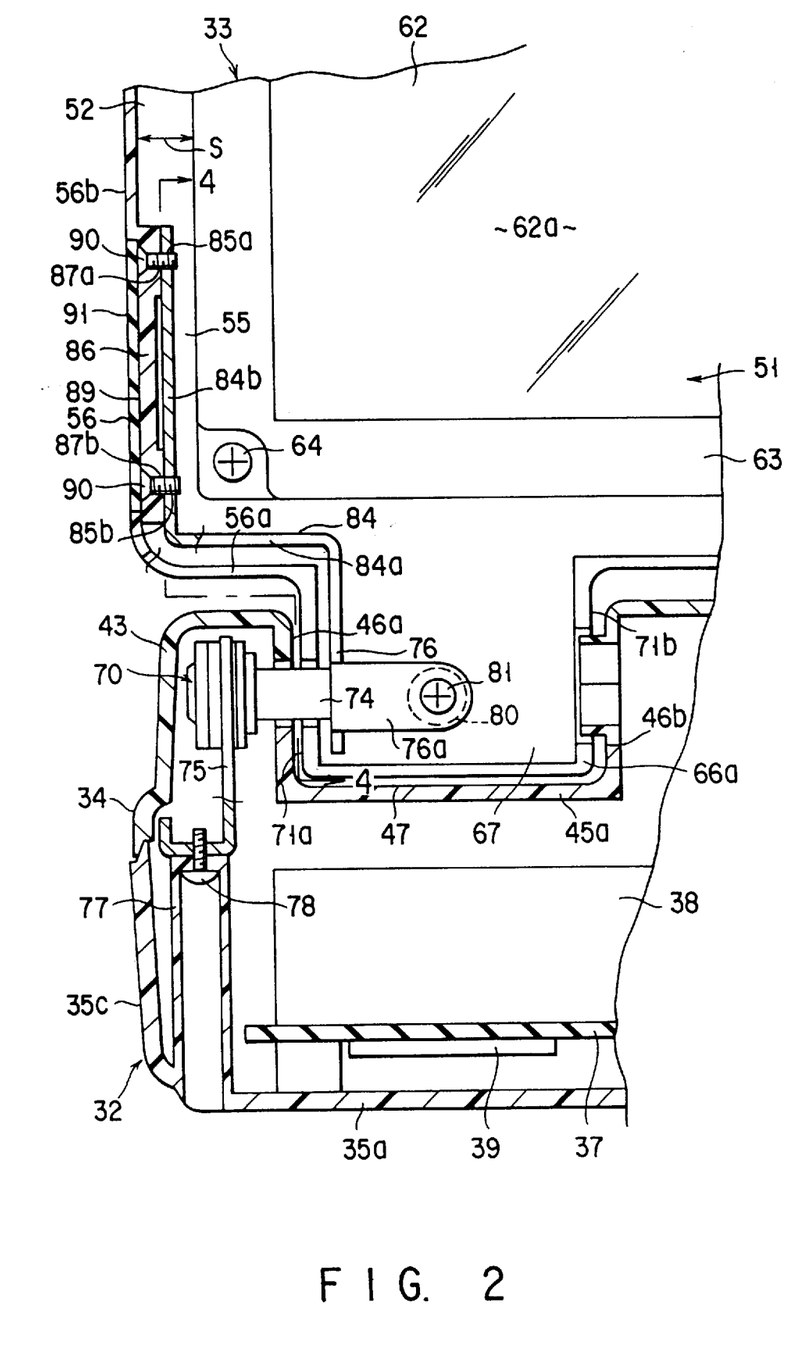
FIG. 2 is a cross-sectional view of the portable computer, showing the structure of a coupling portion between a main body and a display unit.

The main body 32 has a housing 34. The housing 34 comprises a bottom wall 35a, as shown in FIG. 2, a top wall 35b facing the bottom wall 35a, a pair of side walls 35c and 35d continuous with peripheral portions of the bottom wall 35a and top wall 35b, and a front wall 35e. The bottom wall 35a has a flat plate-like shape, extending in the width direction and depth direction of the housing 34. The side walls 35c and 35d and front wall 35e extend from the peripheral portion of the bottom wall 35a in the thickness direction of housing 34.

As is shown in FIG. 2, a circuit board 37, or one of functional elements, is contained within the housing 34. The circuit board 37 is supported on the bottom wall 35a of housing 34. The circuit board 37 is situated in parallel to the bottom wall 35a. The circuit board 37 is surrounded by the side walls 35c and 35d and front wall 35e. A hard disk drive (HDD) 38 and a circuit part 39 such as a DRAM are mounted on the circuit board 37. The HDD 38 is packaged as a single module.

As is shown in FIG. 1, a keyboard 40, click switch buttons 41a and 41b, etc. are arranged on the top wall 35b of housing 34. The top wall 35b has a projecting portion 43 at a rear part of the keyboard 40. The projecting portion 43 extends in the width direction of housing 34. The projecting portion 43 has a hollow shape, communicating with the inside of the housing 34.

The projecting portion 43 includes first and second display support portions 45a and 45b which are spaced apart in the width direction of housing 34. Each of the first and second display support portions 45a and 45b is formed in a recess shape, opening to the front side, upper side and rear side of the projecting portion 43 successively. The first and second display support portions 45a and 45b have the same structure, except that their dimensions in the width direction of housing 34 are different. FIG. 2 shows the first display support portion 45a. The first display support portion 45a has a pair of side surfaces 46a and 46b and a bottom surface 47. The side surfaces 46a and 46b are spaced apart in the width direction of housing 34. The bottom surface 47 extends between lower end portions of the side surfaces 46a and 46b.

The display unit 33 comprises a display housing 50 and a liquid crystal display (LCD) device 51 contained within the display housing 50 as a functional element. The display housing 50 comprises a display cover 52 and a display mask 53 detachably coupled to the display cover 52. The display cover 52 and display mask 53 cooperate with each other in covering the LCD device 51. The display housing 50 has a flat box-like shape and a size matching with the housing 34 of main body 32.

Figure 3:
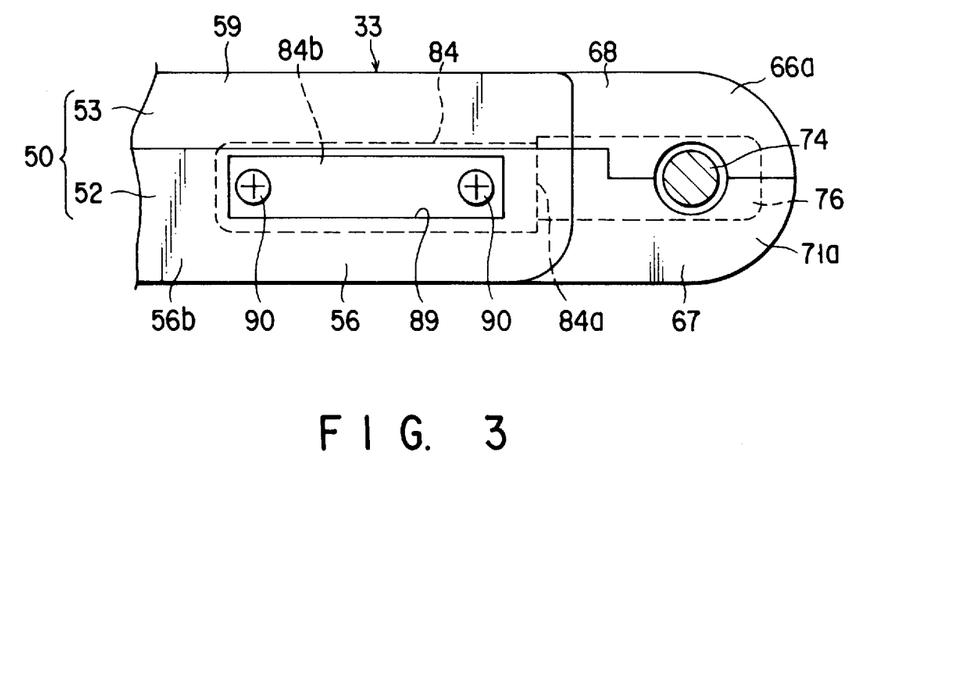
FIG. 3 is a side view of the display unit.
Figure 4:
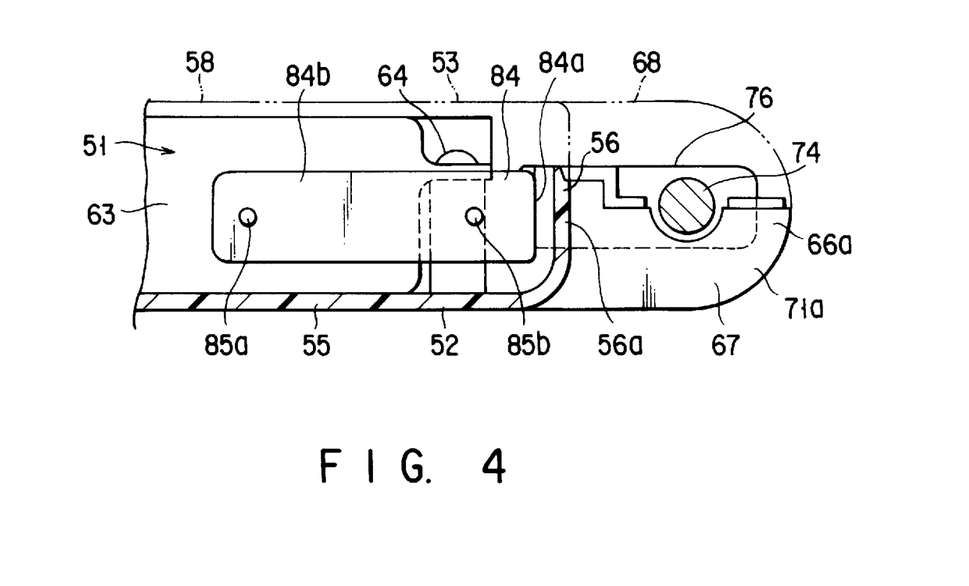
FIG. 4 is a cross-sectional view taken along line 4—4 in FIG. 2.

As is shown in FIGS. 2 to 4, the display cover 52 has a rear wall 55 and a peripheral wall 56 continuous with a peripheral edge of the rear wall 55. The rear wall 55 has a flat plate-like shape, extending in the width direction and depth direction of display housing 50. The peripheral wall 56 extends from the peripheral edge of the rear wall 55 in the thickness direction of display housing 50. The peripheral wall 56 includes first portions 56a extending in the width direction of display housing 50 and second portions 56b extending in the height direction of display housing 50.

The display mask 53 comprises a front wall 58 and a peripheral wall 59 continuous with a peripheral edge of the front wall 58. The front wall 58 faces the rear wall 55. The front wall 58 has an opening 60, as shown in FIG. 1. The opening 60 has such a size that it extends over substantially the entire area of the front wall 58. The peripheral wall 59 is continuous with the peripheral wall 56 of display cover 52. The peripheral wall 59 of display mask 53 cooperates with the peripheral wall 56 of display cover 52 to surround the LCD device 51.

The LCD device 51 includes a liquid crystal (LC) panel 62 having a display screen 62a, and a frame 63 supporting the LC panel 62. The LCD device 51 is fixed to the rear wall 55 of display cover 52 by means of screws 64 at the corner portions of the frame 63. Thereby, the side portions of the LCD device 51 are located adjacent to the second portions 56b of peripheral wall 56. The display screen 62a of LCD device 51 is exposed to the outside through the opening 60 of display mask 53.

As is shown in FIG. 1, the display housing 50 has first and second support legs 66a and 66b which are spaced apart in the width direction of display housing 50. The first and second support legs 66a and 66b have a common structure. FIGS. 3 and 4 show the first support leg 66a. The first support leg 66a has a first section 67 continuous with the display cover 52 and a second section 68 continuous with the display mask 53. The first and second sections 67 and 68 are abutted upon each other so that each of the first and second support legs 66a and 66b may have a hollow cylindrical shape, communicating with the inside of display housing 50.

The first and second support legs 66a and 66b are inserted in the first and second display support portions 45a and 45b of housing 34. Each of the first and second support legs 66a and 66b has a pair of side surfaces 71a and 71b, as shown in FIG. 2 (showing the first support leg 66a representatively). The side surfaces 71a and 71b are opposed to the side surfaces 46a and 46b of display support portion 45a.

The first and second support legs 66a and 66b are supported on the housing 34 of main body 32 by means of hinge mechanisms 70, respectively. Since the structures for supporting the first and second support legs 66a and 66b are the same, the structure for the first support leg 66a will now be described representatively.

As is shown in FIG. 2, the hinge mechanism 70 comprises a hinge shaft 74 and first and second brackets 75 and 76. The hinge shaft 74 is situated horizontal, penetrating the side surface 46a of display support portion 45a and the side surface 71a of first support leg 66a. The hinge shaft 74 has a first end portion and a second end portion. The first end portion of hinge shaft 74 is located within the projecting portion 43 of main body 32, and the second end portion of hinge shaft 74 is located within the first support leg 66a of display housing 50.

The first bracket 75 is rotatably coupled to the first end portion of hinge shaft 74. The first bracket 75 is contained within the housing 34 and located in a left end portion of housing 34. The first bracket 75 is fixed by means of a screw 78 to a boss portion 77 extending upward from the bottom wall 35a of housing 34. The boss portion 77 is situated between the side wall 35c of housing 34 and the circuit board 37.

The second bracket 76 is fixed to the second end portion of the hinge shaft 74. The second bracket 76 is contained within the first support leg 66a. The second bracket 76 has a tongue portion 76a which is fixed by means of a screw 81 to a boss portion 80 provided on the inner face of the first section 67.

As is shown in FIGS. 2 and 4, the second bracket 76 has a coupling portion 84. The coupling portion 84 serves to increase the strength of the coupling between the second bracket 76 and display housing 50. The coupling portion 84 includes a first plate portion 84a and a second plate portion 84b. The first and second plate portions 84a and 84b have flat strip-like shapes, respectively. The first plate portion 84a extends along the first portion 56a of the peripheral wall 56, and the second plate portion 84b extends along the second portion 56b of the peripheral wall 56.

The second plate portion 84b of coupling portion 84 is located between the second portion 56b of peripheral wall 56 and the side portion of LCD device 51. The second plate portion 84b has a pair of screw holes 85a and 85b which are spaced apart in the longitudinal direction of the second plate portion 84b.

As is shown in FIG. 2, the second portion 56b of peripheral wall 56 has an inner surface exposed to the inside of the display housing 50. A support portion 86 is formed on the inner surface of the second portion 56b. The support portion 86 is positioned so as to face the second plate portion 84b. The support portion 86 projects from the inner surface of the second portion 56b toward the inside of display housing 50. Thus, the wall thickness of the support portion 86 is set to be greater than that of the second portion 56b of peripheral wall 56. The support portion 86 has a pair of through-holes 87a and 87b. The through-holes 87a and 87b communicate with the screw holes 85a and 85b in the second plate portion 84b.

The second portion 56b of peripheral wall 56 has an outer surface exposed to the outside of display housing 50, and a recess portion 89 is formed in the outer surface. The recess portion 89 is positioned so as to correspond to the support portion 86. The recess portion 89 has a bottom surface in which the through-holes 87a and 87b are formed.

Countersunk head screws 90 are passed through the through-holes 87a and 87b from the outside of display housing 50. The screws 90 are engaged in the screw holes 85a and 85b through the through-holes 87a and 87b.

Thereby, the second plate portion 84b is superposed on the support portion 86 of peripheral wall 56, and the second bracket 76 is fixed to the display cover 52.

A cover 91 formed of a synthetic resin or rubber is detachably fitted in the recess portion 89. The cover 91 has a sheet-like shape and covers the heads of screws 90. The cover 91 is flush with the outer surface of the second portion 56b of peripheral wall 56.

According to this structure, the second bracket 76 located within the display housing 50 has the coupling portion 84 extending along the peripheral wall 56 of display cover 52, and the second plate portion 84b of coupling portion 84 is fixed to the second portion 56b of peripheral wall 56. Therefore, there is no need to provide the rear wall 55 of display cover 52 with boss portions for receiving the coupling portion 84 of second bracket 76.

Accordingly, there is no need to provide a large space for containing the boss portions between the side portion of LCD device 51 and the second portion 56b of peripheral wall 56, and a distance S between the side portion of LCD device 51 and the second portion 56b of peripheral wall 56 can be greatly decreased. Thus, the width-directional inside space of the housing 50 can be increased without enlarging the display housing 50 itself, and the LCD device 51 and, accordingly, the LC panel 62 can be enlarged.

In addition, according to the above structure, the coupling portion 84 of second bracket 76 is fixed to the peripheral wall 56 of display cover 52 by means of the countersunk head screws 90 inserted from the outside of the display cover 52. Accordingly, the second bracket 76 can be fixed to the display cover 52 without inserting the finger or tools into the limited inner space of display cover 52. Therefore, the second bracket 76 can be fixed easily.

Besides, the peripheral wall 56 has the support portion 86 with increased thickness, at the position facing the second plate portion 84b of second bracket 76. Accordingly, the second plate portion 84b can be firmly supported by the support portion 86, and the strength of the attachment of the second bracket 76 is increased.

Furthermore, the heads of the countersunk head screws 90 are covered by the cover 91 and are not exposed to the outside of display housing 50. The cover 91 is fitted in the recess portion 89 of peripheral wall 56 so as to be continuous and flush with the outer surface of peripheral wall 56. Thus, the cover 91 itself is not conspicuous. Accordingly, the countersunk head screws 90 are hidden, and a good external appearance of the display housing 50 can be achieved.

Figure 5:
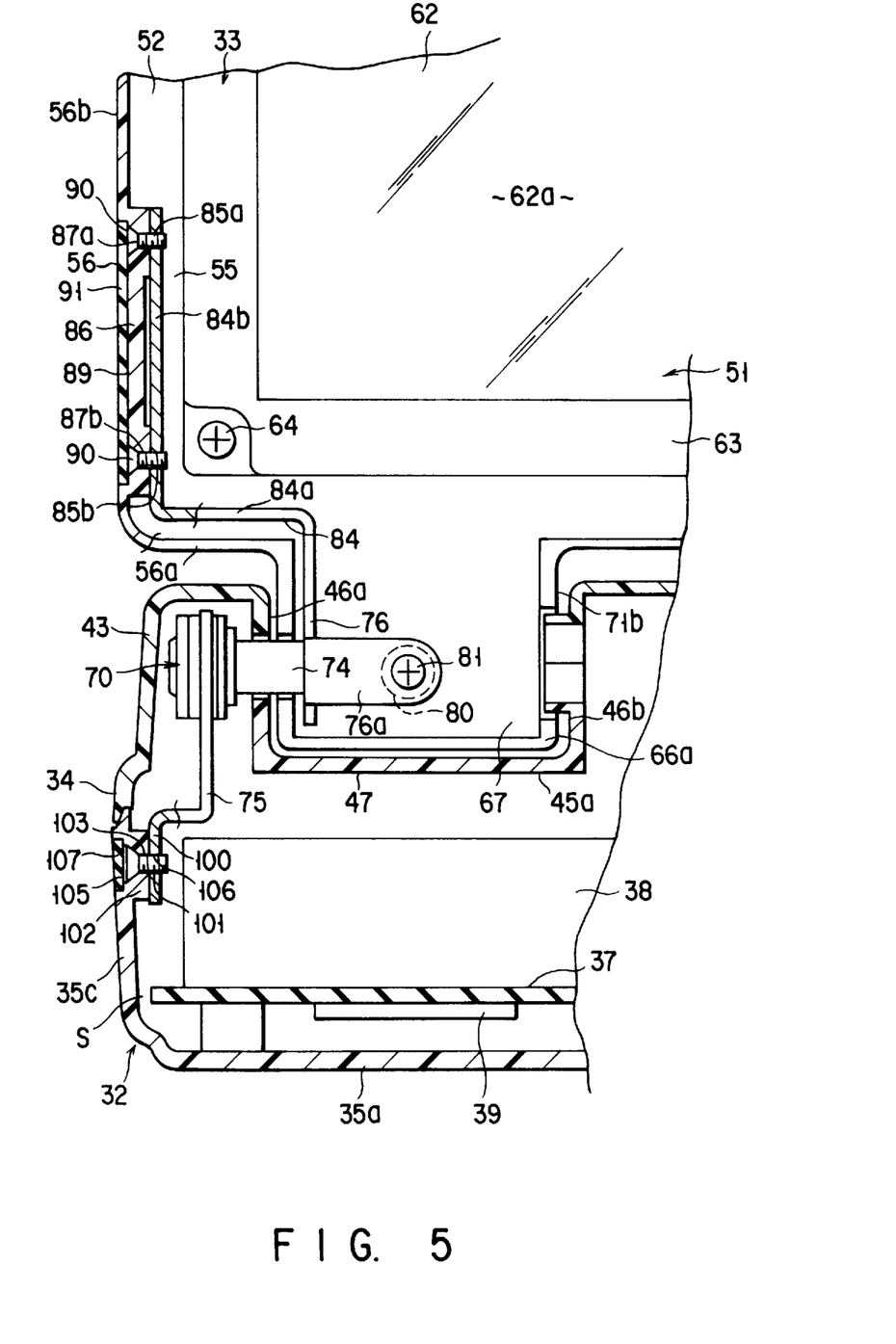
FIG. 5 is a cross-sectional view of a portable computer according to a second embodiment of the invention, showing the structure of a coupling portion between a main body and a display unit.

The present invention is not limited to the first embodiment. FIG. 5 shows a second embodiment of the present invention.

The second embodiment differs from the first embodiment in the structure of the coupling portion between the first bracket 75 of hinge mechanism 70 and the housing 34. The second embodiment is the same as the first embodiment in the other structures. The structural parts common to those of the first embodiment are denoted by like reference numerals and a description thereof is omitted.

As is shown in FIG. 5, the first bracket 75 has a support portion 100 extending from the inside of the projecting portion 43 into the inside of the housing 34. The support portion 100 is situated in a left end portion of the housing 34. The support portion 100 has a flat plate-like shape and extends along the left-hand side wall 35c. The support portion 100 faces the side wall 35c. The support portion 100 has a screw hole 101.

The side wall 35c has an inner surface exposed to the inside of the housing 34. A support portion 102 is formed on the inner surface of the side wall 35c. The support portion 102 is positioned so as to face the support portion 100. The support portion 102 projects from the inner surface of the side wall 35c toward the inside of the housing 34. Thus, the support portion 102 is made thicker than the side wall 35c. The support portion 102 has a through-hole 103 which communicates with the screw hole 101 in the support portion 100.

The side wall 35c has an outer surface exposed to the outside of housing 34, and a recess portion 105 is formed in the outer surface. The recess portion 105 is positioned so as to correspond to the support portion 102. The recess portion 105 has a bottom surface in which the through-hole 103 is formed.

A countersunk head screw 106 is inserted into the through-hole 103 from the outside of housing 34. The screw 106 is engaged in the screw hole 101 through the through-hole 103. Thereby, the support portion 100 is superposed on the support portion 102, and the first bracket 75 is fixed to the housing 34.

A cover 107 formed of a synthetic resin or rubber is detachably fitted in the recess portion 105. The cover 107 has a sheet-like shape and covers the head of screw 106. The cover 107 is flush with the outer surface of side wall 35c.

According to this structure, the support portion 100 of first bracket 75 located within the housing 34 is superposed on and fixed to the support portion 102 of side wall 35c. Therefore, there is no need to provide the bottom wall 35a of housing 34 with a boss portion for receiving the first bracket 75.

Accordingly, there is no need to provide a useless space for containing the boss portions between the side wall 35c of housing 34 and the edge portion of the circuit board 37, and a distance S between the edge portion of the circuit board 37 and the side wall 35c can be greatly decreased. Thus, the width-directional inside space of the housing 34 can be increased without enlarging the housing 34 itself, and the circuit board 37 can be enlarged. Furthermore, since the mounting area of the circuit board 37 is increased, many circuit elements 39 can be easily mounted on the circuit board 37 and the space for mounting the HDD 38 is provided sufficiently.

In addition, according to the above structure, the support portion 100 of first bracket 75 is fixed to the side wall 35c by means of the countersunk head screw 106 inserted from the outside of the housing 34. Accordingly, the first bracket 75 can be fixed to the housing 34 without inserting the finger or tools into the limited inner space of housing 34. Therefore, the first bracket 75 can be fixed easily.

Besides, that portion of the side wall 35c, which corresponds to the support portion 100 of first bracket 75, is provided with the support portion 102 with increased thickness. Accordingly, the support portion 100 can be firmly supported by the support portion 102, and the strength of the attachment of the first bracket 75 is increased.

Furthermore, the head of the countersunk head screw 106 is covered by the cover 107 and is not exposed to the outside of housing 34. The cover 107 is fitted in the recess portion 105 of side wall 35c so as to be continuous and flush with the outer surface of side wall 35c. Thus, the cover 107 itself is not conspicuous. Accordingly, the countersunk head screw 106 is hidden, and a good external appearance of the housing 34 can be achieved.

In the first and second embodiments, the second plate portion 84b of coupling portion 84 is screwed down to the second portion 56b of peripheral wall 56. However, for example, the first plate portion 84a of coupling portion 84 may also be screwed down to the first portion 56a of peripheral wall 56.

The second plate portion 84b may be removed from the second bracket 76, and the first plate portion 84a alone may be screwed down to the first portion 56a of peripheral wall 56.

Figure 6:
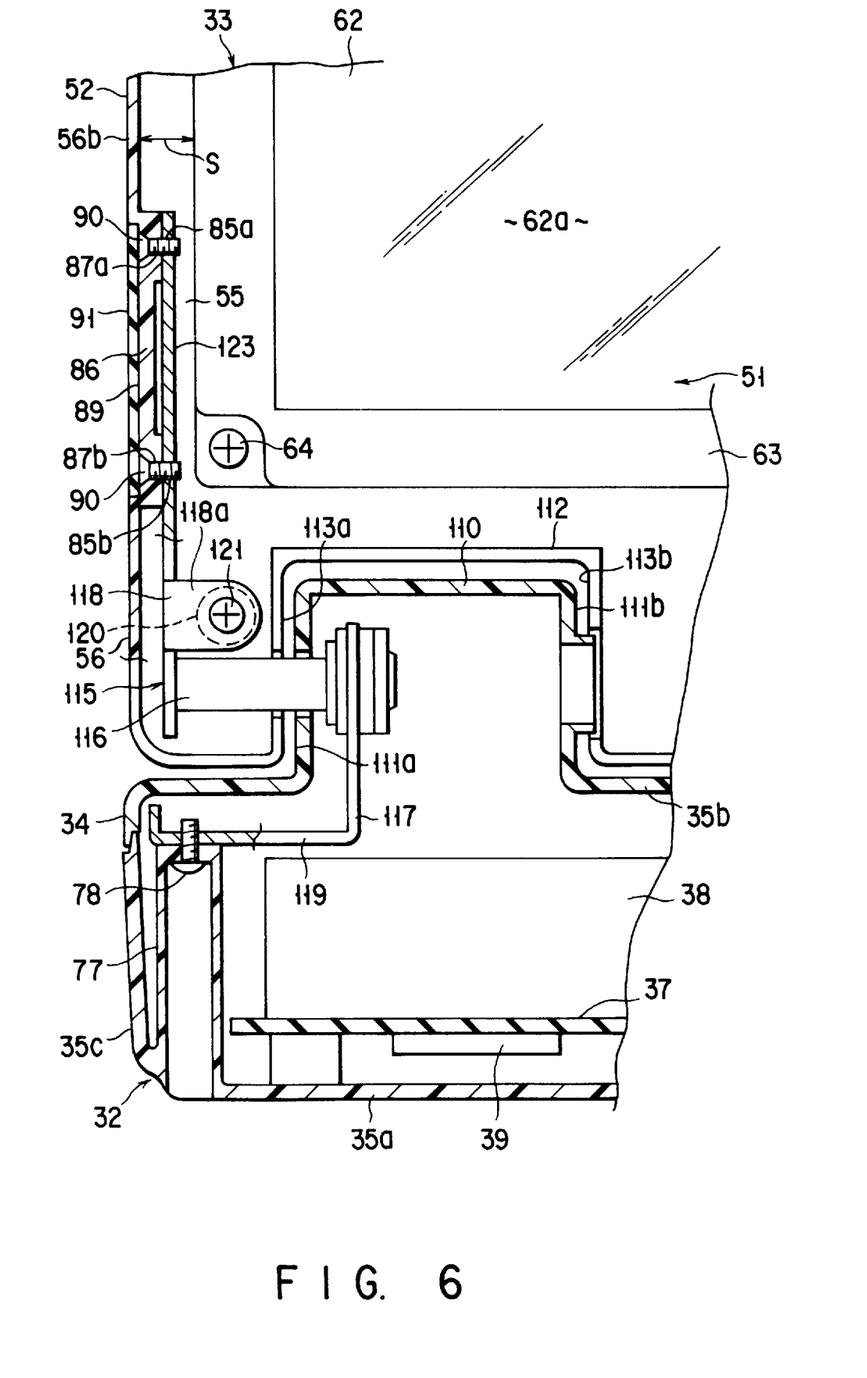
FIG. 6 is a cross-sectional view of a portable computer according to a third embodiment of the invention, showing the structure of a coupling portion between a main body and a display unit.

FIG. 6 shows a third embodiment of the present invention.

The third embodiment is similar to the first embodiment except for the structure of the coupling portion between the main body 32 and the display unit 33. In the third embodiment, the structural parts common to those of the first embodiment are denoted by like reference numerals and a description thereof may be omitted.

As is shown in FIG. 6, the housing 34 of main body 32 has a pair of support projection portions 110 (only one of which is shown) at the rear end portion of the top wall 35b. The support projection portions 110 are spaced apart in the width direction of housing 34. Each of the support projection portions 110 has a pair of side surfaces 111a and 111b.

The display housing 50 of display unit 33 has a pair of support recess portions 112 (only one of which is shown). The support recess portions 112 are associated with the support projection portions 110 of housing 34. Each of the support recess portions 112 has a pair of side surfaces 113a and 113b.

Each support projection portion 110 is inserted in the associated support recess portion 112 such that the side surfaces 111a and 111b of the support projection portion 110 are opposed to the side surfaces 113a and 113b of the support recess portion 112. The display housing 50 is rotatably coupled to the housing 34 by means of hinge mechanisms 115.

The hinge mechanism 115 comprises a hinge shaft 116 and first and second brackets 117 and 118. The hinge shaft 116 is situated horizontal, penetrating the side surface 111a of support projection portion 110 and the side surface 113a of support recess portion 112. The hinge shaft 116 has a first end portion located within the support projection portion 110 and a second end portion located within the display housing 50.

The first bracket 117 is rotatably coupled to the first end portion of hinge shaft 116. The first bracket 117 has a support portion 119 extending from the inside of the support projection portion 110 into the inside of the housing 34. The support portion 119 is fixed by means of the screw 78 to the boss portion 77 extending from the bottom wall 35a in the left end region of the housing 34. The second bracket 118 is fixed to the second end portion of hinge shaft 116. The second bracket 118 is contained within the display housing 50. The second bracket 118 has a tongue portion 118a. The tongue portion 118a is fixed by means of a screw 121 to a boss portion 120 situated on the rear wall 55. The boss portion 120 is located between the support recess portion 112 and the second portion 56b of peripheral wall 56 below the LCD device 51.

The second bracket 118 has a flat plate-like shape and extends along the second portion 56b of peripheral wall 56. The second bracket 118 has a coupling portion 123 extending between the second portion 56b of peripheral wall 56 and the side portion of LCD device 51. The coupling portion 123 faces the inner surface of the peripheral wall 56. As in the first embodiment, the coupling portion 123 is fixed by means of the countersunk head screw 90 to the support portion 86 on the inner surface of peripheral wall 56.

According to this structure, too, the second bracket 118 is superposed on and screwed down to the peripheral wall 56 of display housing 50, and the distance S between the side portion of LCD device 51 and peripheral wall 56 can be greatly decreased. Thus, the width-directional inside space of the housing 50 can be increased without enlarging the display housing 50 itself, and the LCD device 51 and, accordingly, the display screen 62a can be enlarged.

The portable apparatus according to the present invention is not limited to the portable computer. This invention is also applicable to, e.g. word processing apparatuses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An electronic apparatus comprising:
   a housing;
   a functional element contained within said housing; and
   a support bracket having a coupling portion situated within said housing;
   wherein said housing comprises a wall for supporting said functional element and a peripheral wall surrounding said functional element and formed to be continuous with a peripheral edge portion of said wall, said coupling portion of said bracket being fixed to said peripheral wall.

2. The electronic apparatus according to claim 1, wherein said functional element comprises a display device having a display screen, and said housing has an opening for exposing said display screen.

3. The electronic apparatus according to claim 2, wherein said housing further comprises a display cover engaging said wall and said peripheral wall and a display mask surrounding said opening and cooperating with said display cover for covering said display device.

4. The electronic apparatus according to claim 1, wherein said functional element comprises a circuit board and a circuit element mounted on said circuit board, said circuit board being parallel to and supported by a wall of said housing.

5. The electronic apparatus according to claim 1, wherein said peripheral wall has an inner surface exposed to an inside space of said housing, and said coupling portion of said bracket has a flat plate-like shape and is affixed to said inner surface of said peripheral wall.

6. The electronic apparatus according to claim 1, wherein said peripheral wall of said housing has a support portion in which a through-hole is formed, said coupling portion of said bracket having a screw hole communicating with said through-hole, said coupling portion being affixed to said support portion by inserting a screw into said through-hole from the outside of said housing with the inserted end portion of said screw engaging said screw hole.

7. The electronic apparatus according to claim 6, wherein said support portion has a wall thickness greater than the wall thickness of said peripheral wall.

8. The electronic apparatus according to claim 6, wherein said peripheral wall of said housing has an outer surface exposed to the outside of said housing, with the portion of said outer surface corresponding to said support portion having a recess portion in which said through-hole is formed, and a cover fitted in said recess portion for covering said screw.

9. A portable computer comprising:

a body having a first housing;

a display unit having a second housing and a display device contained within said second housing; and a hinge mechanism for rotatably coupling said display unit to said body, said hinge mechanism having a bracket situated within said second housing;

wherein said second housing comprises a wall for supporting said display device and a peripheral wall surrounding said display device and formed to be continuous with a peripheral edge portion of said wall, said bracket being fixed to said peripheral wall.

10. The portable computer according to claim 9, wherein said display device has a display screen, and said second housing has an opening for exposing said display screen.

11. The portable computer according to claim 10, wherein said second housing further comprises a display cover for supporting said display device and a display mask cooperating with said display cover for covering said display device, said display mask having an opening for exposing said display screen.

12. The portable computer according to claim 9, wherein said peripheral wall of said second housing has a support portion having a plurality of through-holes communicating with a plurality of screw holes in said bracket, said bracket being affixed to said support portion by inserting screws into said through-holes from the outside of said second housing, with the inserted end portions of said screws engaging said screw holes.

13. A portable computer comprising:

a body having a first housing and a circuit board contained in said first housing;

a display unit having a second housing and a display device contained within said second housing; and a hinge mechanism for rotatably coupling said display unit to said body, said hinge mechanism having a first bracket situated within said first housing and a second bracket situated within said second housing;

said first housing comprising a bottom wall for supporting said circuit board and a side wall surrounding said circuit board and formed to be continuous with a peripheral edge portion of said bottom wall, said first bracket being fixed to said side wall; and said second housing comprising a wall for supporting said display device and a peripheral wall surrounding said display device and formed to be continuous with a peripheral edge portion of said wall, said second bracket being fixed to said peripheral wall.

14. The portable computer according to claim 13, wherein said side wall of said first housing has a support portion in which a through-hole is formed, said first bracket having a screw hole communicating with said through-hole, said first bracket being affixed to said side wall by inserting a screw into said through-hole from the outside of said first housing, with the inserted end portion of said screw engaging said screw hole.

15. The portable computer according to claim 13, wherein said peripheral wall of said second housing has a support portion in which a plurality of through-holes are formed, said second bracket having a plurality of screw holes communicating with said through-holes, said second bracket being affixed to said peripheral wall by inserting screws into said through-holes from the outside of said second housing, with the inserted end portions of said screws engaging said screw holes.

16. The portable computer according to claim 13, further comprising:

a functional element comprising a single module, and being mounted on said circuit board and contained within said housing.

* * * * *